United States Patent
Galbiati

(10) Patent No.: US 12,033,663 B2
(45) Date of Patent: Jul. 9, 2024

(54) CURRENT SENSING CIRCUIT AND HARD DISK DRIVE INCLUDING SAME

(71) Applicant: STMicroelectronics S.r.l., Agrate Brianza (IT)

(72) Inventor: Ezio Galbiati, Agnadello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/343,868

(22) Filed: Jun. 29, 2023

(65) Prior Publication Data

US 2024/0038268 A1 Feb. 1, 2024

(30) Foreign Application Priority Data

Jul. 29, 2022 (IT) .......................... 102022000016119

(51) Int. Cl.
*G11B 19/28* (2006.01)
*G11B 21/02* (2006.01)
*G11B 25/04* (2006.01)
*G11B 27/36* (2006.01)

(52) U.S. Cl.
CPC .......... *G11B 21/025* (2013.01); *G11B 25/043* (2013.01); *G11B 27/36* (2013.01); *G11B 2220/2516* (2013.01)

(58) Field of Classification Search
CPC ... G11B 19/28; G11B 25/043; G11B 19/2081; G11B 2220/2516; G11B 19/2063; G11B 5/622; H02K 16/00

USPC ...................................................... 360/73.03
See application file for complete search history.

(56) References Cited

U.S. PATENT DOCUMENTS 7,705,548 B2    4/2010   Galbiati
10,944,341 B2 *   3/2021   Linggajaya ........... H02P 29/025

FOREIGN PATENT DOCUMENTS

EP      1863164 A1    12/2007

OTHER PUBLICATIONS

Wikipedia, "Zener diode," retrieved on Feb. 21, 2023, 7 pages.

* cited by examiner

*Primary Examiner* — Nabil Z Hindi
(74) *Attorney, Agent, or Firm* — Slater Matsil, LLP

(57) ABSTRACT

A circuit includes a set of input nodes configured to be coupled to respective ones of the windings of a spindle motor in a hard disk drive to sense the voltages applied to the windings. A set of output nodes is configured to provide output signals indicative of direction of flow of the currents through the windings. Level shifters are coupled to respective input nodes in the set of input nodes and have level-shifted output nodes configured to provide down-shifted replicas of the voltages at the respective input nodes in the set of input nodes. Flip-flops have inputs coupled to respective ones of the level-shifted output nodes of the level shifters and outputs configured to provide the output signals coupled to respective output nodes.

20 Claims, 10 Drawing Sheets

CURRENT SENSING CIRCUIT AND HARD DISK DRIVE INCLUDING SAME

CROSS-REFERENCE TO RELATED APPLICATIONS

This application claims the priority benefit of Italian patent application number 102022000016119, filed on Jul. 29, 2022, which is hereby incorporated by reference to the maximum extent allowable by law.

TECHNICAL FIELD

The disclosure relates to a current sensing circuit for use, e.g., with hard disk drives (HDDs).

BACKGROUND

Hard disk drives (HDDs) employ a spindle motor to rotate one or more disks as well as voice coil motors or VCMs to move the heads with respect to the disk(s).

Adequate implementation in terms of, e.g., synchronous spindle step-up may involve using high-voltage semiconductor components. This may be expensive as regards semiconductor (silicon) area occupied, primarily if compared with the total silicon area taken by the power circuit ("combo"). For instance, six comparators may be involved in comparing each spindle half bridge output with a motor supply voltage or with ground.

SUMMARY

The disclosure relates to a current sensing. One or more embodiments can be applied, for instance, to hard disk drives used in processing devices such as computers, servers, data centers and the like.

One or more embodiments aim at adequately addressing the issues outlined in the foregoing section.

One or more embodiments relate to a corresponding hard disk drive.

One or more embodiments relate to a corresponding processing device. A computer, a server, or data center equipped with a hard disk drive are exemplary of such a device.

One or more embodiments relate to a corresponding method.

In solutions as described herein, detection of the spindle current polarity, as exploited in performing an active flyback phase during synchronous spindle step-up operation, can be performed using a level shifter interfacing each spindle half bridge output directly to a flip-flop (D-type, for instance).

Solutions as described herein may involve performing a current polarity check during a tri-state (tristate) phase, using a configuration that does not involve the use of high-voltage comparator components.

During a tristate phase, the polarity of the spindle current can be detected by checking (only) the status of each half-bridge output using low-voltage components, for instance using a level shifter interfacing each spindle half-bridge output directly to a flip-flop (D-type, for instance).

Solutions as described herein provide circuitry for current polarity detection that is simpler and less expensive than conventional solutions.

Solutions as described can be used in a wide variety of power "combos" for the HDD market.

BRIEF DESCRIPTION OF THE DRAWINGS

One or more embodiments will now be described, by way of example only, with reference to the annexed figures, wherein.

Corresponding numerals and symbols in the different figures generally refer to corresponding parts unless otherwise indicated.

Figure 1:
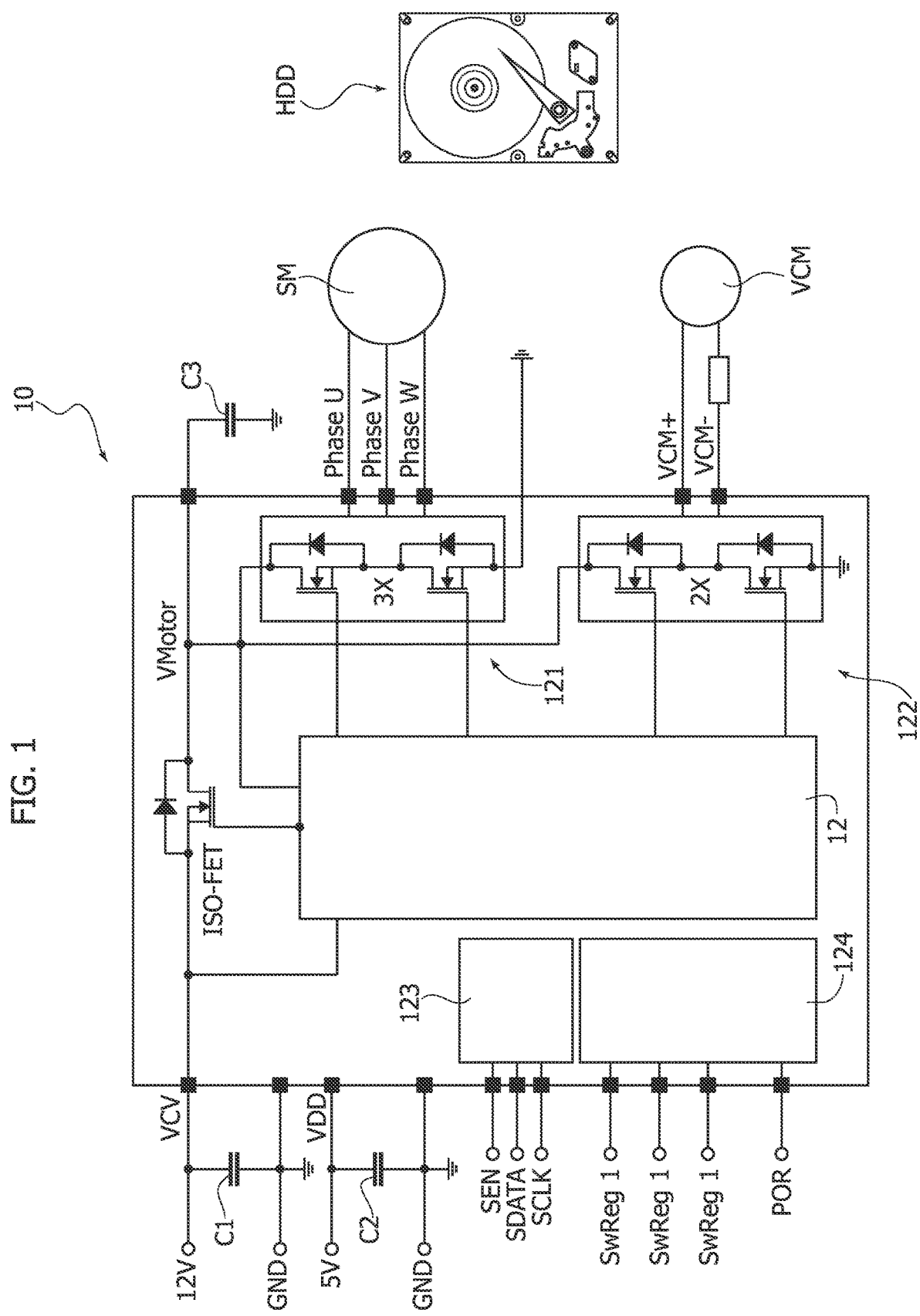
FIG. 1 is a block diagram of a power control circuitry ("combo") used in a hard disk application.

The figures are drawn to clearly illustrate the relevant aspects of the embodiments and are not necessarily drawn to scale.

The edges of features drawn in the figures do not necessarily indicate the termination of the extent of the feature.

Also, for the sake of simplicity and ease of explanation, a same designation may be applied throughout this description to designate a circuit node or line as well as a signal occurring at that node or line.

DETAILED DESCRIPTION OF ILLUSTRATIVE EMBODIMENTS

In the ensuing description, various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment," "in one embodiment," or the like, that may be present in various points of the present description do not necessarily refer exactly to one and the same embodiment. Furthermore, particular configurations, structures, or characteristics may be combined in any adequate way in one or more embodiments.

The headings/references used herein are provided merely for convenience and hence do not define the extent of protection or the scope of the embodiments.

As discussed in the introductory portion of this description, HDD is an initialism for Hard Disk Drive.

A hard disk drive is a basic component of various types of processing devices such as personal computers, servers, data centers or the like and is the physical location where information is stored.

Hard disk drives (HDDs) employ a spindle motor to rotate one or more disks as well as voice coil motors or VCMs to move the heads with respect to the disk(s).

Rectification of the spindle motor back electromotive force (BEMF) at power off so to supply an emergency (head) retract procedure is a desirable feature in HDD applications.

Spindle BEMF rectification should desirably provide voltage and current to an extent sufficient to safely move the heads on the top of the parking ramp, avoiding the risk of leaving the heads on the media (disk or disks).

Conventional methods for spindle BEMF rectification include synchronous rectification (active or passive), and synchronous spindle step-up (active or passive).

Whether synchronous rectification or synchronous spindle step-up is adopted is suggested by the application conditions. Factors such as the electromechanical characteristics of the spindle and voice coil motors, the rotational speed involved and the parking method selected may be taken into account.

For instance, synchronous rectification may be preferred when the voltage amplitude resulting from BEMF rectification is (more than) adequate to supply the voice coil motor when performing retract of the heads at power down.

Conversely, synchronous spindle step-up is preferred when the voltage resulting from synchronous rectification would not be enough to facilitate adequate operation of the circuit controlling the heads retract.

A solution based on synchronous spindle step-up is described, e.g., in U.S. Pat. No. 7,705,548. In that solution, energy recovery during recirculation phases of the phase windings of a multiphase spindle motor is increased when all the MOSFETs of the output bridge stage associated therewith are turned off (tristated) for charging a hold capacitor. This is accomplished by allowing the recirculation of the motor currents through the same MOSFETs of the output bridge stage that are turned on during the current recirculation phases. Recirculation of the currents and the charging of the hold capacitor takes place through fully saturated power MOSFETs.

While satisfactory in terms of the results achieved, implementing that solution involves high-voltage components. The implementation of such a feature, in terms of semiconductor (silicon) area, is expensive if compared with the total silicon area of the power "combo" used to control the spindle and VCM motors in an HDD application.

FIG. 1 is a block diagram of a circuit 10 configured to control a spindle motor SM and a VCM in a hard disk drive HDD.

The circuit 10 is built around a spindle and VCM motor controller 12 configured to drive the spindle motor SM via a spindle power stage 121, and the VCM via a VCM power stage 122.

References 123 and 124 in FIG. 1 indicate a serial interface and regulator plus power monitor circuitry.

At supply (e.g., 12V) power off (e.g., emergency power-off), a switch such as isolator field-effect transistor ISO_FET (FIG. 1, top) is immediately turned off by the controller 12 so as to isolate a VCV line/node coupled to the power supply from a line Vmotor intended to provide supply power to the spindle motor SM.

The regulator 12, supplied by the Vmotor (voltage) line, has integrated therein a routine (e.g., SW-based) to implement both rectification of the back electromotive force (BEMF) of the spindle motor SM and parking of the HDD heads via the VCM.

At 12V power off the ISO_FET is immediately turned off, so as to isolate the VCV line from the Vmotor line. An automatic routine performing both spindle BEMF rectification and parking of the heads is integrated in the Spindle and VCM Motor Controller block that is supplied by the Vmotor voltage.

As discussed so far, the arrangement of FIG. 1 is conventional in the art, which makes it unnecessary to provide a more detailed description herein.

Also, while a single VCM is illustrated herein for simplicity, plural VCMs may be included in a hard disk drive HDD as illustrated herein.

Figure 2:
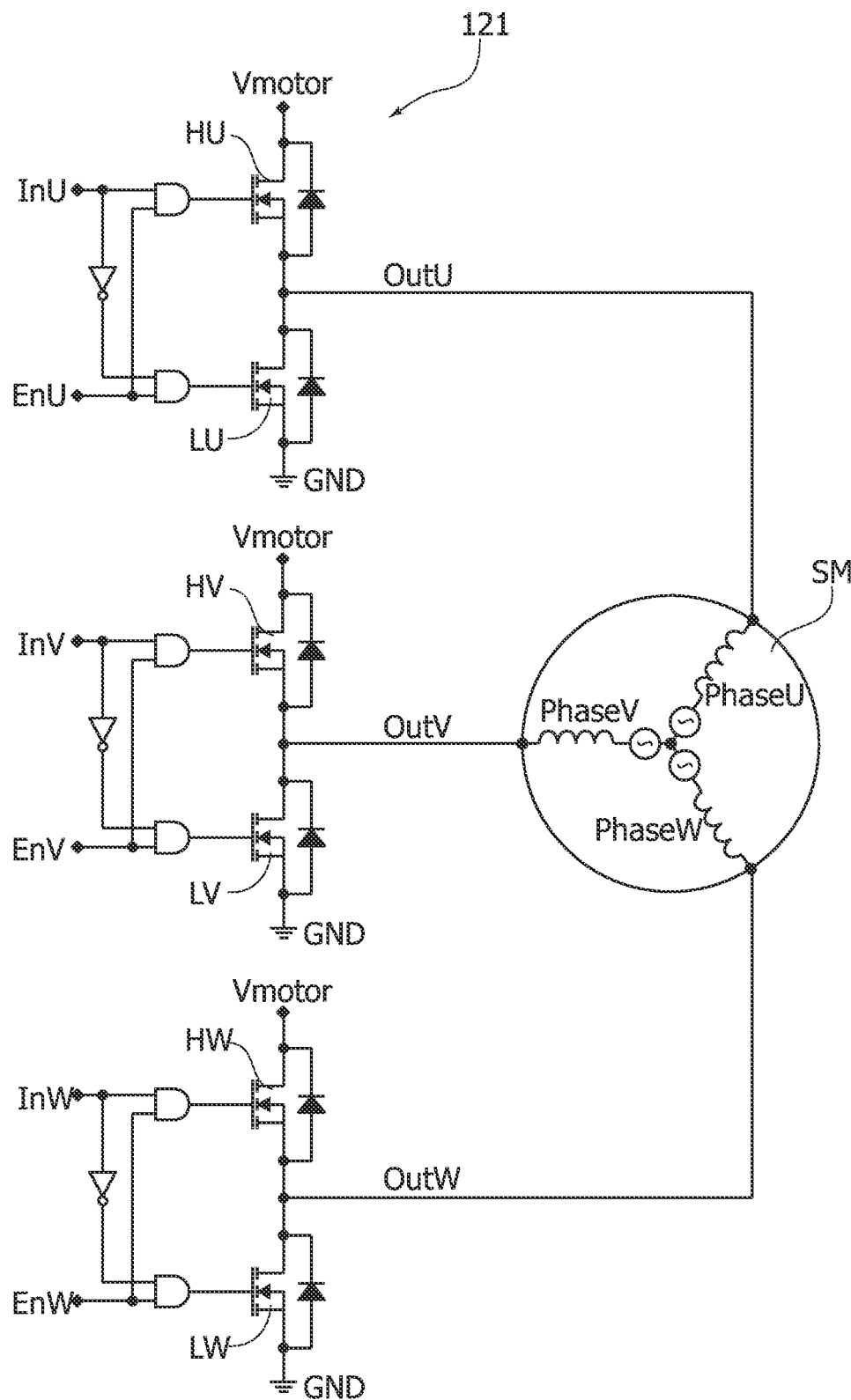
FIG. 2 is a diagram showing a triple half-bridge arrangement driving the windings of a spindle motor in a hard disk drive (HDD)

FIG. 2 is a more detailed circuit diagram of a possible implementation of a power stage 121 for controlling rotation of the spindle motor SM based on a triple half-bridge arrangement controlled by three input signals InU (Phase U, PhU), InV (Phase V, PhV), and InW (Phase W, PhW), controlling the activation of the high-side switches HU, HV, and HW or low-side switches LU, LV, LW (e.g., MOSFET transistors) in each half-bridge, and three enable signals, with each half-bridge controlled (enabled) by an enable signal EnU (Phase U, PhU), EnV (Phase V, PhV), and EnW (Phase W, PhW).

As illustrated, each half-bridge comprises a pair of switches HU, LU; HV, LV; and HW, LW having current flow paths therethrough (source-drain, in the case of field-effect transistors such as MOSFET transistors) cascaded between a supply node Vmotor and ground GND.

The representation of the transistors HU, LU; HV, LV; and HW, LW in the figures also includes the respective recirculation (body) diodes.

Driving (that is, making alternatively conductive and non-conductive) the switches HU, LU; HV, LV; and HW, LW is via the respective control terminals (gates, in the case of field-effect transistors such as MOSFET transistors) and logic networks. These logic components are shown but not expressly labeled for simplicity in FIG. 2.

For each half-bridge, the logic circuit includes a first AND gate that has an output driving the control terminal (gate, in the case of field-effect transistors such as MOSFET transistors) of the high-side switch HU, HV, HW of the respective half-bridge. The first AND gate receives as inputs a respective input signal InU (Phase U, PhU) or InV (Phase V, PhV) and a respective enable signal EnU (Phase U, PhU), EnV (Phase V, PhV), and EnW (Phase W, PhW).

The logic circuit for each half bridge also includes a second AND gate that has an output driving the control terminal (gate, in the case of field-effect transistors such as MOSFET transistors) of the low-side switch LU, LV, LW. Each second AND gate receives as inputs a respective logically inverted (complemented) input signal InU (Phase U, PhU) or InV (Phase V, PhV) and a respective enable signal EnU (Phase U, PhU), EnV (Phase V, PhV), and EnW (Phase W, PhW).

The phases PhU, PhV, and PhW of the spindle motor are driven via respective signals OutU, OutV, and OutW taken at intermediate nodes of the half-bridge transistor pairs, namely between the transistors HU and LU, between the transistors HV and LV, and between the transistors HW and LW.

Figure 3B:
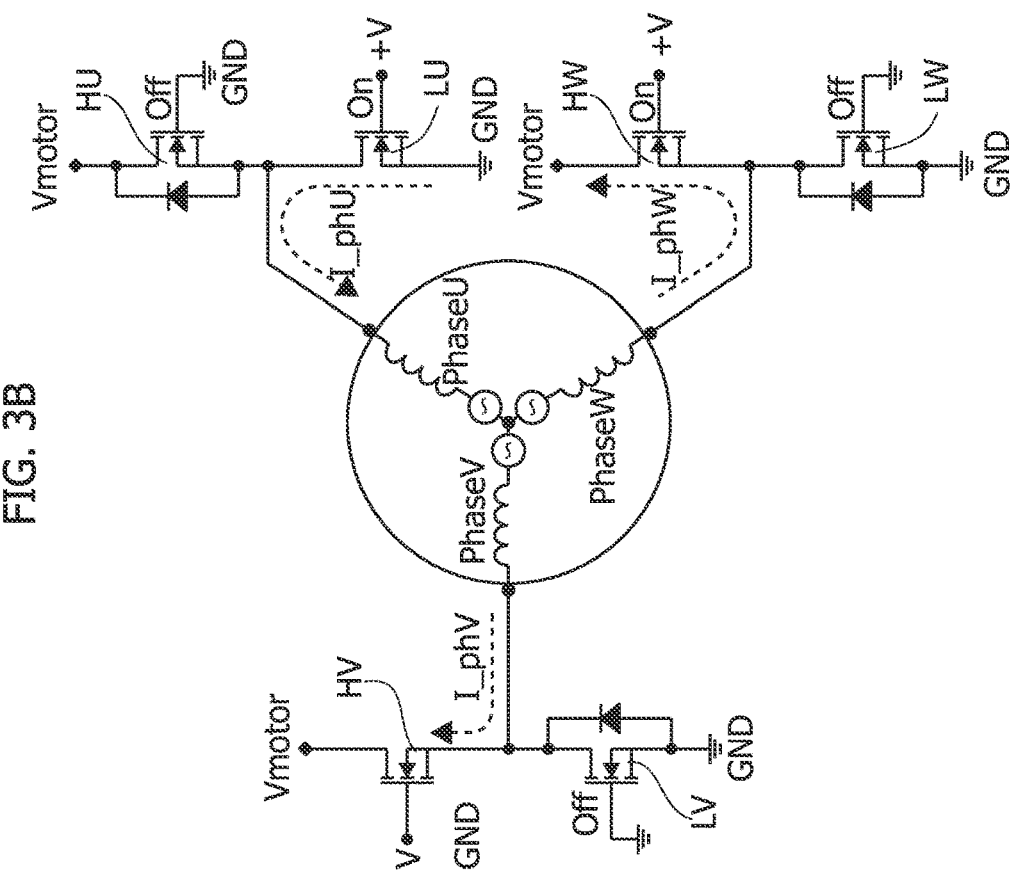
FIGS. 3A and 3B are illustrative of a brake phase (FIG. 3A) and an active step-up phase (FIG. 3B) in operation of a spindle motor in an HDD.
Figure 3A:
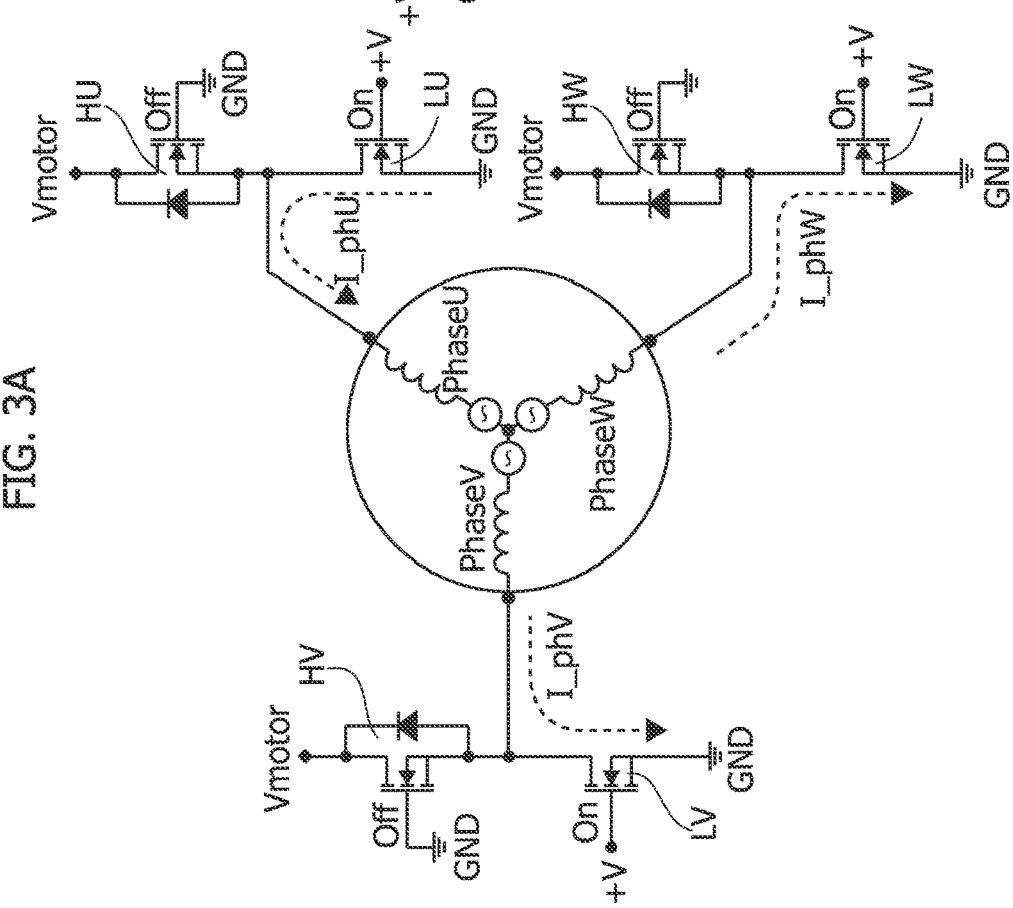

FIGS. 3A and 3B are illustrative of a possible operating principle of a power stage 121 as illustrated in FIG. 2 during active spindle step-up.

During a brake phase (as illustrated in FIG. 3A), all the three low-side switches LU, LV, and LW are turned on (namely made conductive). During this phase, the spindle motor SM is short-circuited, with the spindle back electromotive force (BEMF) forcing currents I_PhU, I_PhV, and I_PhW through the three windings (e.g., with a current I_PhU flowing into the motor SM and currents I_PhV and I_PhW flowing out of the motor SM).

During an active step-up phase (as illustrated in FIG. 3B), the winding motor currents (e.g., with a current I_PhU flowing into the motor SM and currents I_PhV and I_PhW flowing out of the motor SM) are forced to recirculate to the supply line Vmotor in response to the (correct) activation (turning on, that is making conductive) of high-side or low-side switches, e.g., LU, HV, and HW in the various half-bridges.

Between the two phases (brake phase of FIG. 3A and active step-up phase of FIG. 3B) a (short) tri-state or tristate phase—not visible in these figures for simplicity—is used to detect the direction of the three winding currents I_PhU, I_PhV, and I_PhW to Vmotor or to GND.

The tristate phase facilitates a correct activation of the switches (MOS transistors) HU, LU; HV, LV; and HW, LW during the active phase in performing active step-up of the Vmotor voltage.

Practically such a tristate phase can be regarded as an anti cross-conduction dead time for each half bridge.

Figure 4:
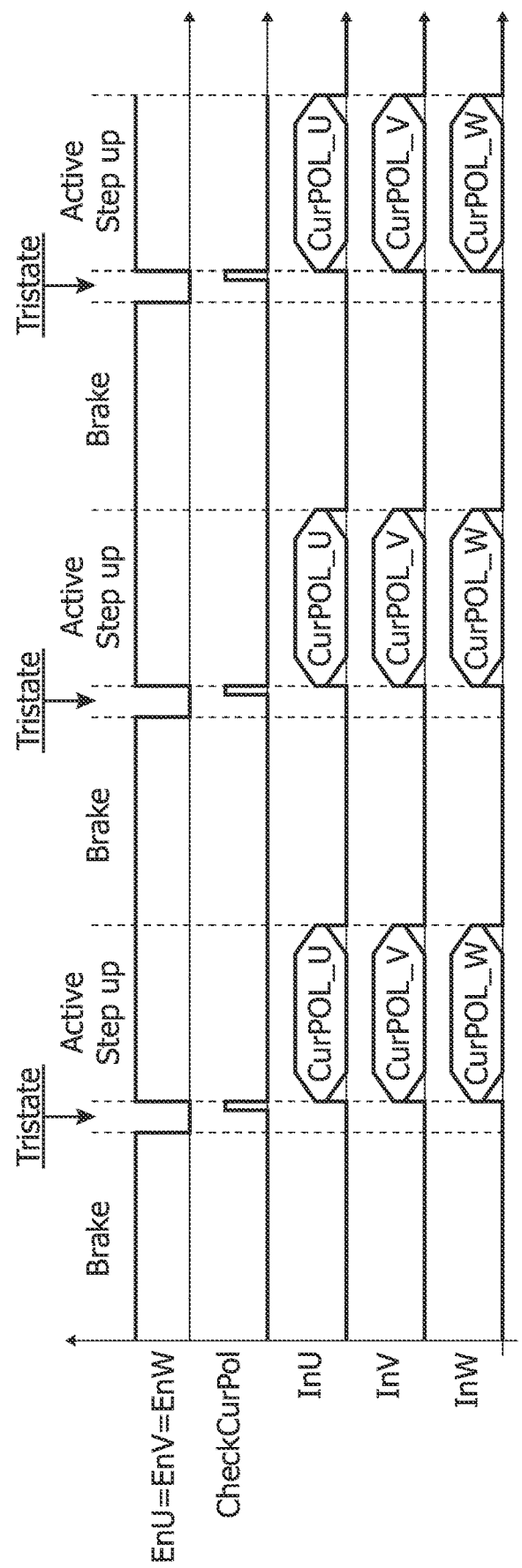
FIG. 4 provides diagrams representing possible behaviors of signals in the case of an active step-up procedure.

FIG. 4 comprises diagrams representing possible behaviors of signals in the case of an active step-up procedure. In particular, FIG. 4 is a timing diagram showing, against a common (abscissa) time scale, the behavior of signals during the Active Step-up procedure, These signals include the enable signals EnU, EnV, and EnW (with EnU=EnV=EnW), a signal designated CheckCurPol that activates the detection of the polarities of the spindle currents, and the signals InU, InV, InW that turn "on" (make conductive) the high-side switches HU, HV, and HW or low-side switches LU, LV, LW (e.g., MOSFET transistors) in each half-bridge during the active step-up phase.

For instance, in the case of the U phase, if, during the tristate phase, the current I_phU flows out of the motor SM and recirculates in the body diode of the high-side MOSFET transistor, the signal InU is set to a logic value (e.g., high) such as to turn on the high-side MOSFET transistor of the half-bridge of the phase U.

The signals InU, InV, InW are thus forced to a high logic level or to a low logic level based on the polarity (direction of flow) of the three currents I_phU/I_phV/I_phW detected during the tristate phase.

The signal CheckCurPol activates spindle currents polarity detection during short tristate phases between brake and active step-up phases as illustrated in FIGS. 3A and 3B.

Figure 5:
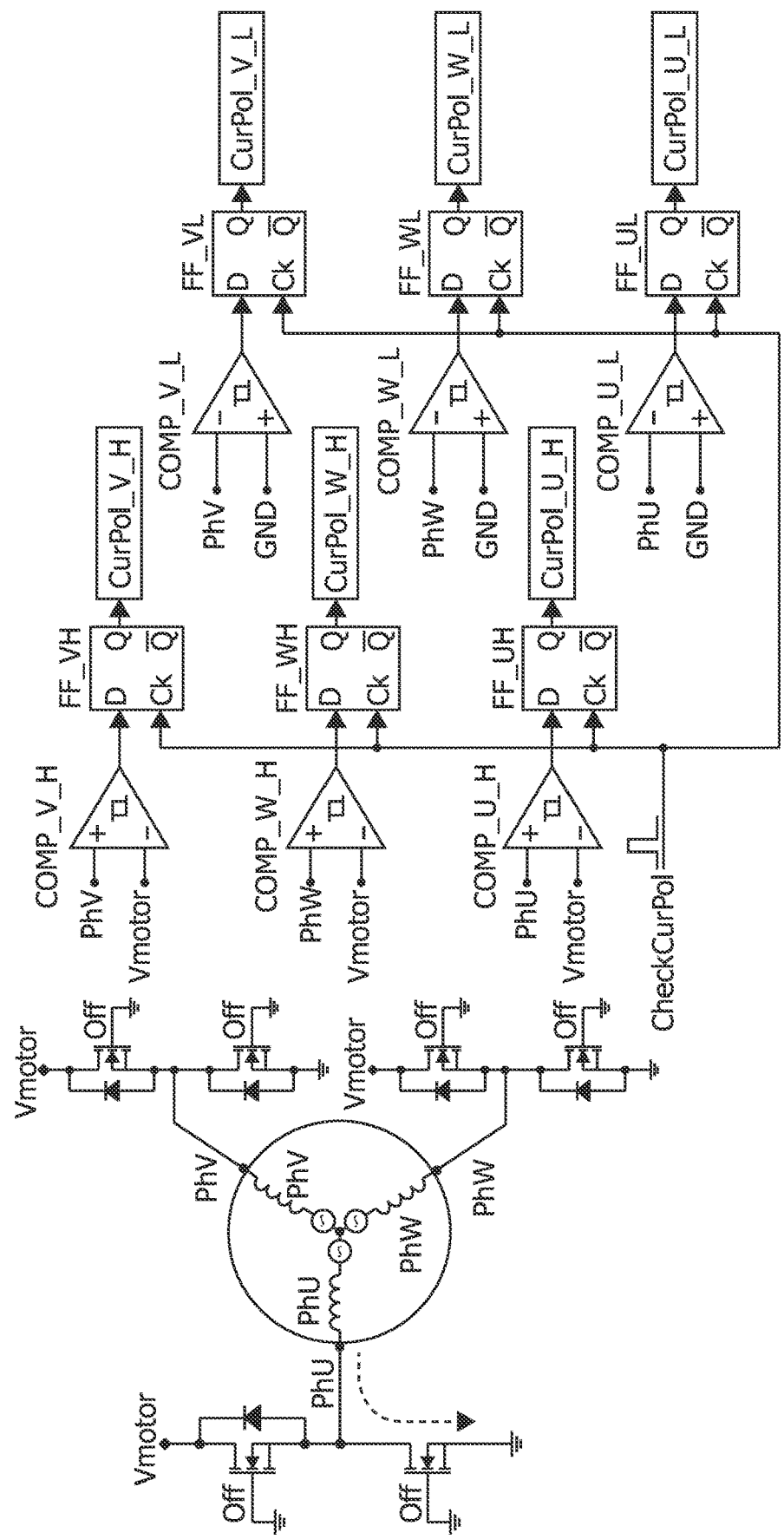
FIG. 5 is a combined diagram illustrative of signal profiles during a so-called tri-state phase.

FIG. 5 is representative of how each spindle current polarity can be detected when in a tristate phase.

In FIG. 5 parts or elements like parts or elements already discussed in connection with previous figures are indicated with like reference symbols and a corresponding detailed description will not be repeated for simplicity and brevity.

FIG. 5 refers to a solution where six comparators are implemented for current polarity detection. Of these, three first, high-side comparators COMP_V_H, COMP_W_H, and COMP_U_H compare phase voltages Ph_V, Ph_W, and Ph_U with the supply voltage Vmotor, and three second, low-side comparators COMP_V_L, COMP_W_L, and COMP_U_L compare phase voltages Ph_V, Ph_W, and Ph_U with ground GND.

The outputs from the three first, high-side comparators COMP_V_H, COMP_W_H, and COMP_U_H are applied to the D inputs of three first high-side (D-type) flip-flops FF_V_H, FF_W_H, and FF_U_H to provide (at their Q outputs) respective current polarity signals CurPol_V_H, CurPol_W_H, and CurPol_U_H.

The outputs from the three second, low-side comparators COMP_V_L, COMP_W_L, and COMP_U_L are applied to the D inputs of three second low-side (D-type) flip-flops FF_V_L, FF_W_L, and FF_U_L to provide (at their Q outputs) respective current polarity signals CurPol_V_L, CurPol_W_L, and CurPol_U_L.

All of the flop-flops FF_V_H, FF_W_H, FF_U_H and FF_V_L, FF_W_L, FF_U_L are clocked at their clock inputs Ck by a common clock signal CheckCurPol (produced in a manner known per se to those of skill in the art).

To summarize, in the tristate phase, the three winding currents fly back to either the node/line Vmotor or to ground GND through the body diodes of the MOSFET transistors of each half bridge (passive step-up) according to the current direction.

Considering, for example, the current though Phase U (PhU) if the current direction during the brake phase (FIG. 3A) was positive (entering into the motor SM), during the tristate phase this current will flow through the body diode of the low-side MOSFET transistor of the half bridge for phase U.

The comparator COMP_U_L is thus able to detect this polarity by setting the signal CurPol_U_L signal to high, while the signal CurPol_U_H will remain low.

As discussed, integrating six comparators to compare each spindle half bridge output with (threshold) levels Vmotor or GND may be quite expensive in terms of semiconductor (e.g., silicon) area, especially if compared against the total silicon area of the power combo. Six comparators as discussed herein may be high-voltage components (~20V) insofar as the voltage swing of the inputs of these comparators follows the output voltage commutation of each half-bridge output.

Figure 6:
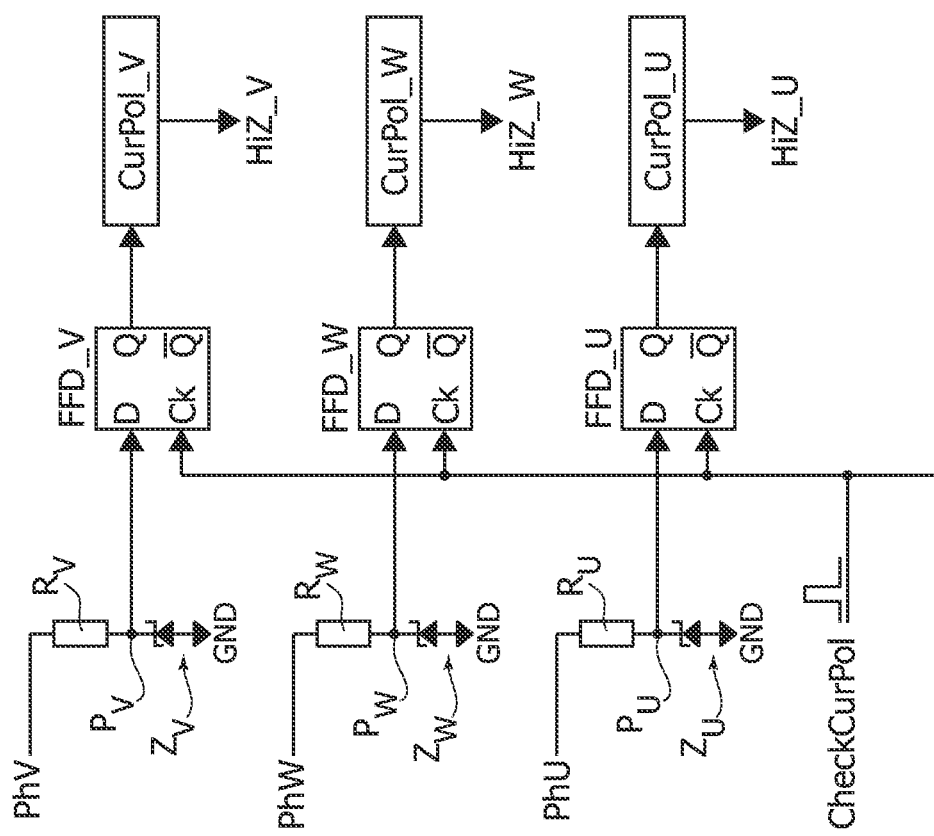
FIG. 6 further details possible operation of embodiments of the present description during a tri-state phase.

FIG. 6 is exemplary of a solution where current polarity (direction of flow) detection is performed using only three (e.g., D-type) flip-flops FF_D_V, FF_D_W, and FF_D_U again clocked at their clock inputs Ck by a common clock signal CheckCurPol.

This solution makes it possible to perform a current polarity check during a tristate phase without using high-voltage comparator components.

In a solution as illustrated in FIG. 6, spindle current polarity detection is performed during a tristate phase, by checking the status of the half-bridge outputs using low-voltage components.

In a solution as illustrated in FIG. 6, the phase (voltage) signals PhV, PhW, PhU are applied to the (e.g., D) inputs of the (e.g., D-type) flip-flops FF_D_V, FF_D_W, and FF_D_U via a level shifter.

In the—purely exemplary—case illustrated here, the level shifter comprises a resistor $R_V$, $R_W$, $R_U$ having a first end coupled to the nodes where the signals PhV, PhW, PhU are present and a second end coupled to (the cathode of) a Zener diode $Z_V$, $Z_W$, $Z_U$.

The inputs of the flip-flops FF_D_V, FF_D_W, and FF_D_U are thus coupled, respectively, to a first level-shifted node $P_V$ between the resistor $R_V$ and the Zener diode $Z_V$, to a second level-shifted node $P_W$ between the resistor $R_W$ and the Zener diode $Z_W$, and to a third level-shifted node $P_U$ between the resistor $R_U$ and the Zener diode $Z_U$.

For instance, considering the phase U (PhU), if the current direction during the brake phase was positive (flowing into the motor SM), during the tristate phase this current will flow through the body diode of the low-side MOSFET transistor LU of the half-bridge U. The output of the flip-flop FF_U will thus set the signal CurPol_U to a "low" level.

Conversely, if the current direction of the phase U, (PhU) during the brake phase was negative (flowing out of the motor SM), the current will fly back to the Vmotor line/node forcing the PhU output to go above the Vmotor level.

In this latter case, the output of the flip-flop FF_U will thus set the signal CurPol_U to a "high" level.

The same reasoning applies to the other phases, namely the phase V, PhV and the phase W, PhW.

Using a Zener diode in the level shifters is advantageous insofar as a Zener diode puts a limit to the maximum swing of the voltages applied to the inputs of the flip-flops FFD_V, FFD_W, and FFD_U.

For instance, the voltages PhV, PhW, and PhU may exceed 16V. In conventional solutions this has suggested using high-voltage components for current detection.

Using a Zener diode facilitates reducing this voltage swing to a value compatible with using low-voltage components, that is, with signals adapted to low-voltage components.

It is again noted that, while advantageous, the implementation illustrated here, using a Zener diode, is merely exemplary of a possible level shifting configuration that can be used to limit the voltage swing applied to the flip-flops FFD_V, FFD_W, and FFD_U. Other level shifting arrangements known to those of skill in the art (e.g., resistive voltage dividers) can be used for that purpose.

The flip-flops FFD_V, FFD_W, and FFD_U are configured to sample the state of the output voltages PhV, PhW and PhU during the short high-impedance phase between the Brake condition and the active step-up phase (a dead time for protection against cross conduction) via the signal CheckCurPol (see FIG. 4). Sampling the signal at the time the flip-flop is triggered at the CK input by the signal CheckCurPol holds and provides the current polarity (direction of flow of the current) to be used in order to activate the switch (MOSFET transistor) to be made conductive during the active step-up phase.

To summarize, a circuit as illustrated herein comprises a set of input nodes PhV, PhW, PhU configured to be coupled each to a respective one of the windings of a spindle motor SM in a hard disk drive HDD to sense the voltages applied to those windings, and a set of output nodes CurPolV, CurPolW, CurPolU configured to provide output signals indicative of the direction of flow of the currents I_PhV, I_PhW, I_PhU through the windings of the spindle motor SM.

Each input node PhV, PhW, PhU is coupled to a respective output node via a level shifter interfacing with a flip-flop.

In the non-limiting example illustrated herein, the level shifter comprises a resistor $R_V$; $R_W$; $R_U$ and a Zener diode $Z_V$; $Z_W$; $Z_U$ coupled between the respective input node PhV, PhW, PhU and a reference node (ground GND, for instance).

The level shifter thus has an output node, here represented (by way of example) by a tap node $P_V$, $P_W$, $P_U$ between the resistor and the Zener diode.

As illustrated herein, the flip-flop FF D_V; FF D_W; FF D_U has an input D coupled to the output node of the level shifter as well as a respective output Q.

To summarize, in an arrangement as illustrated herein, each input node PhV, PhW, PhU is coupled to a respective output node CurPolV, CurPolW, CurPolU via the cascaded arrangement of a level shifter (e.g., $R_V$, $Z_V$; $R_W$, $Z_W$; $R_U$, $Z_U$) coupled to a respective input node PhV, PhW, PhU and having a level-shifted output node $P_V$, $P_W$, $P_U$ configured to provide a down-shifted replica (with reduced swing) of the voltage at the respective input node PhV, PhW, PhU, and a flip-flop FF D_V; FF D_W; FF D_U having an input (e.g., D) coupled to a respective level-shifted output node $P_V$, $P_W$, $P_U$ of the level shifter $R_V$, $Z_V$; $R_W$, $Z_W$; $R_U$, $Z_U$ as well as an output Q configured to provide an output signal indicative of direction of flow of a respective one of the currents I_PhV, I_PhW, I_PhU through the windings of the spindle motor.

As illustrated herein, the outputs Q of the flip-flops FF D_V; FF D_W; FF D_U are thus configured to provide output signals indicative of direction of flow of the currents I_PhV, I_PhW, I_PhU through the windings of the spindle motor SM.

As illustrated herein (merely by way of non-limiting example), the level shifters comprise a resistor $R_V$; $R_W$; $R_U$ coupled between the respective input node PhV, PhW, PhU and a tap node $P_V$, $P_W$, $P_U$, with the Zener diode $Z_V$; $Z_W$; $Z_U$ coupled between the tap node $P_V$, $P_W$, $P_U$ and the reference node (e.g., ground GND).

As illustrated herein, the level shifters comprise the Zener diode $Z_V$; $Z_W$; $Z_U$ having its cathode thereof coupled to the tap node $P_V$, $P_W$, $P_U$.

As illustrated herein, the flip-flops FF D_V; FF D_W; FF D_U comprise D-type flip-flops.

A circuit as illustrated herein is suited to be used in a hard disk drive (HDD) as depicted in FIG. 1. For example, an HDD can comprise a spindle motor SM having a plurality of windings. A circuit as illustrated herein has its input nodes PhV, PhW, PhU coupled to the windings of the spindle motor SM to sense the voltages applied to the windings. A controller 12 is coupled to the output nodes CurPolV, CurPolW, CurPolU and is configured to receive therefrom output signals indicative of the direction of flow of the currents I_PhV, I_PhW, I_PhU through these windings and to control the spindle motor SM (in a manner known per se to those of skill in the art) as a function of the output signals indicative of the direction of flow of the currents I_PhV, I_PhW, I_PhU.

The integration of a circuit as discussed herein involves only a level shifter (for instance, $R_V$, $Z_V$; $R_W$, $Z_W$; and $R_U$, $Z_U$) for each half-bridge output interfaced with a flip-flop (D-type, for instance).

This is (much) less expensive in terms of semiconductor area in comparison with integrating six high-voltage comparators.

Figure 7:
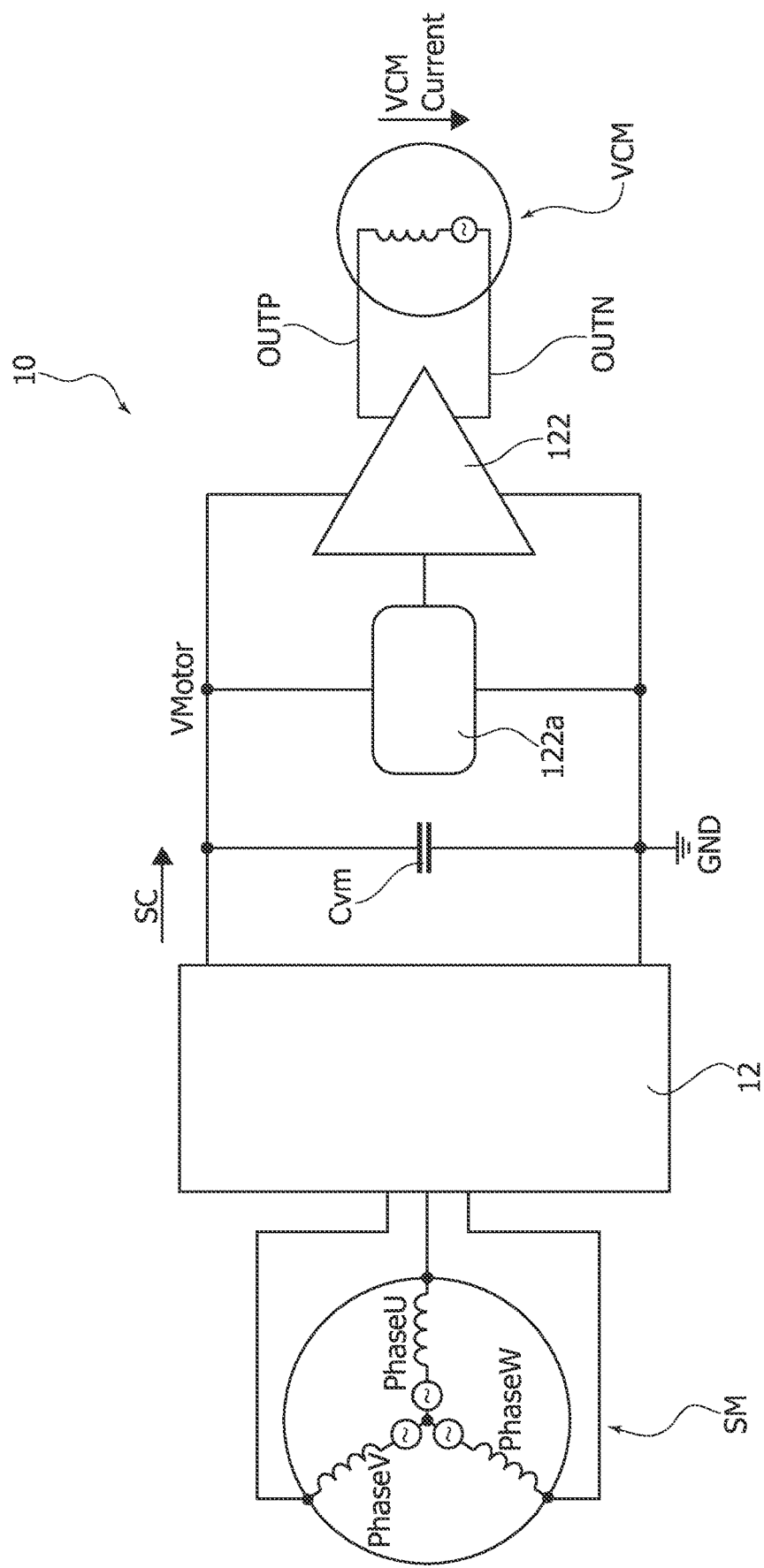
FIG. 7 is a simplified block diagram showing the situation of the circuitry of FIG. 1 at power off.

FIG. 7 is a simplified block diagram showing the situation of a system as considered herein at power off (e.g., when a head retract procedure is energized via rectification of the BEMF of the spindle motor SM).

To that effect, the voltages across the windings ("phases" PhaseU, PhaseV, PhaseW in FIG. 1) of the spindle motor SM are supplied to the controller (regulator) 12.

Based thereon, the controller 12 (which may include for that purpose, e.g., a synchronous step-up regulator module operating at 40 kHz with 60% duty-cycle) produces a (rectified) spindle current SC. This current is used to charge a capacitor Cvm coupled to the line Vmotor and referred to a reference node such as ground GND.

The energy stored on the capacitor Cvm can thus be used to implement, via a VCM power stage 122 controlled via a module 122A (operating, e.g., at 1 kHz with 60% duty-cycle), a retract procedure for the VCM.

That is, FIG. 7 is a simplified block diagram of the situation at power off, when, during synchronous step-up, the spindle BEMF is rectified so as to maintain the Vmotor voltage to a level adequate to facilitate head retract.

For instance, retract can be performed with a constant voltage of 1.5V applied to the VCM.

Such operation is per se conventional in the art, which makes it unnecessary to provide a more detailed description herein.

Figure 8:
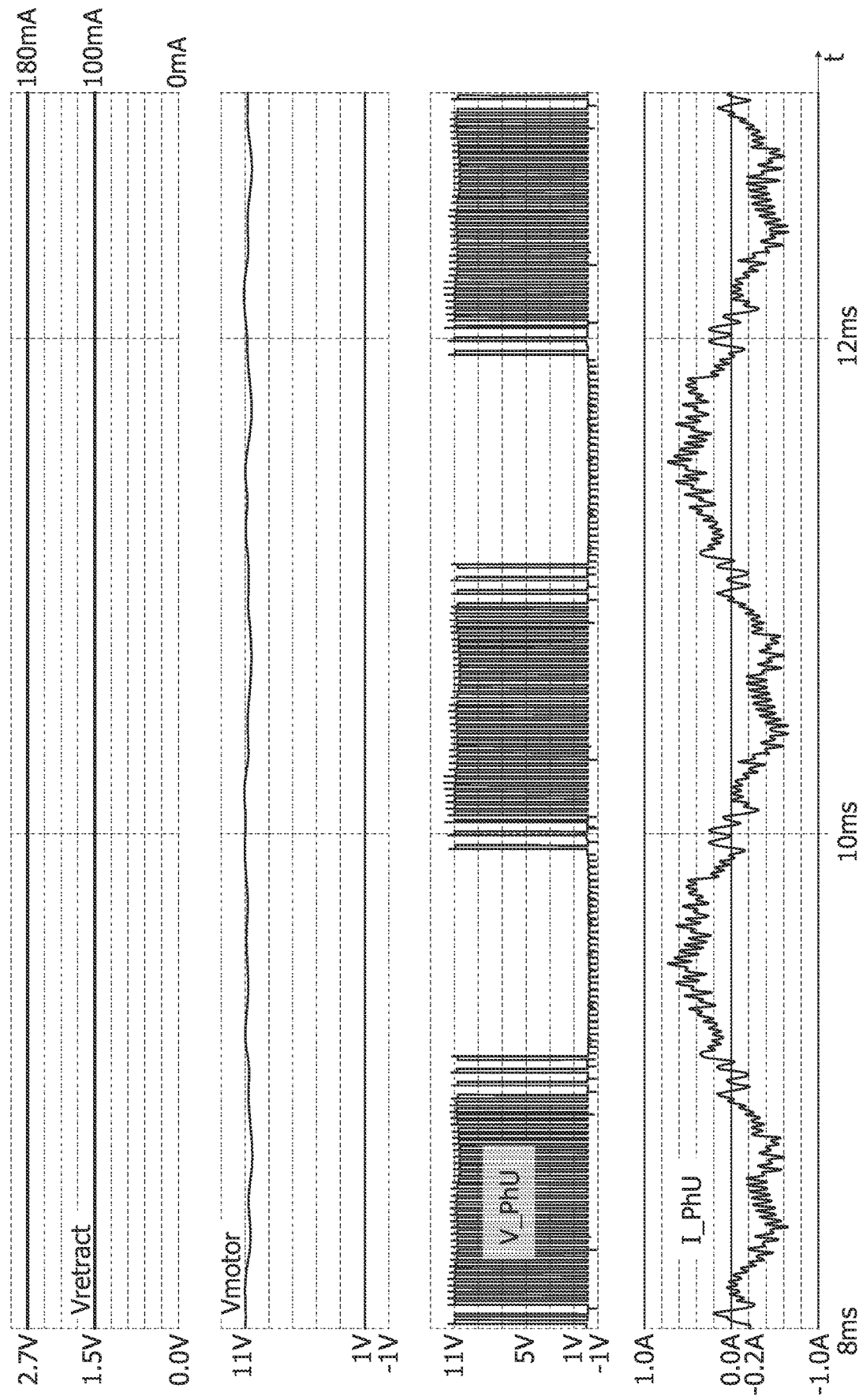
FIGS. 8, 9 and 10 represent possible behaviors of signals in of embodiments of the present description.

FIG. 8 is a diagram with a first set of curves sharing a common (abscissa) time scale illustrative of a possible synchronous step-up procedure aiming at maintaining the Vmotor voltage at a high level when a VCM (see FIG. 1) is in the process of performing a head retract.

Specifically, the curves in FIG. 8 are illustrative of a possible time behavior during an active step-up for spindle BEMF rectification at power off. In particular, the curves illustrate (from top to bottom): a current (e.g., 175 mA) flowing into the VCM coil; a voltage Vretract (e.g., 1.5 V) that energizes the head retract procedure; the voltage Vmotor (e.g., 11.0 V); the (phase U) voltage V_PhU; and the (phase U) current I_PhU.

Of course, the quantitative values indicated/shown are purely indicative and non-limiting.

A solution as described herein lends itself to being used in a spindle motor drive procedure. Embodiments are known per se to those of skill in the art and also shown in FIGS. 3A and 3B, FIG. 4 and the discussion of FIG. 5. For example, the controller drives the spindle motor SM in an alternate sequence of a brake phase (Brake), an active step-up phase (Active Step up), and a tristate phase (Tristate) between the brake phase and the active step-up phase.

In the brake phase (Brake), the spindle motor SM is short-circuited and the spindle back electromotive force (BEMF) forces currents I_PhU, I_PhV, and I_PhW through the windings of the spindle motor SM. In the active step-up phase (Active Step up), the currents I_PhU, I_PhV, and I_PhW through the windings of the spindle motor SM are recirculated as function of their direction of flow to a supply line (e.g., Vmotor) of the spindle motor SM. In the tristate phase (Tristate) the direction of flow of the currents I_PhV, I_PhW, I_PhU through the windings of the currents is detected based on the output signals of the flip-flops FF D_V; FF D_W; FF D_U.

The spindle current profile of FIG. 8 shows that, in response to a change in current polarity, the switching activity of the V_PhU voltage (and thus the current ripple frequency) may not be at the normal switching operation frequency (e.g., 40 KHz), and present some sub harmonics.

Such an under-modulation of the frequency of the spindle current ripple may be regarded unfavorably, e.g., due to possible undesired emission of acoustic noise.

In order to counter this possible drawback, that is, in order to counter an undesired under-modulation of the switching frequency in synchronous spindle step-up, the first spindle current polarity inversion can be intercepted in order to facilitate a corresponding corrective action of the undesired under-modulation.

Figure 9:
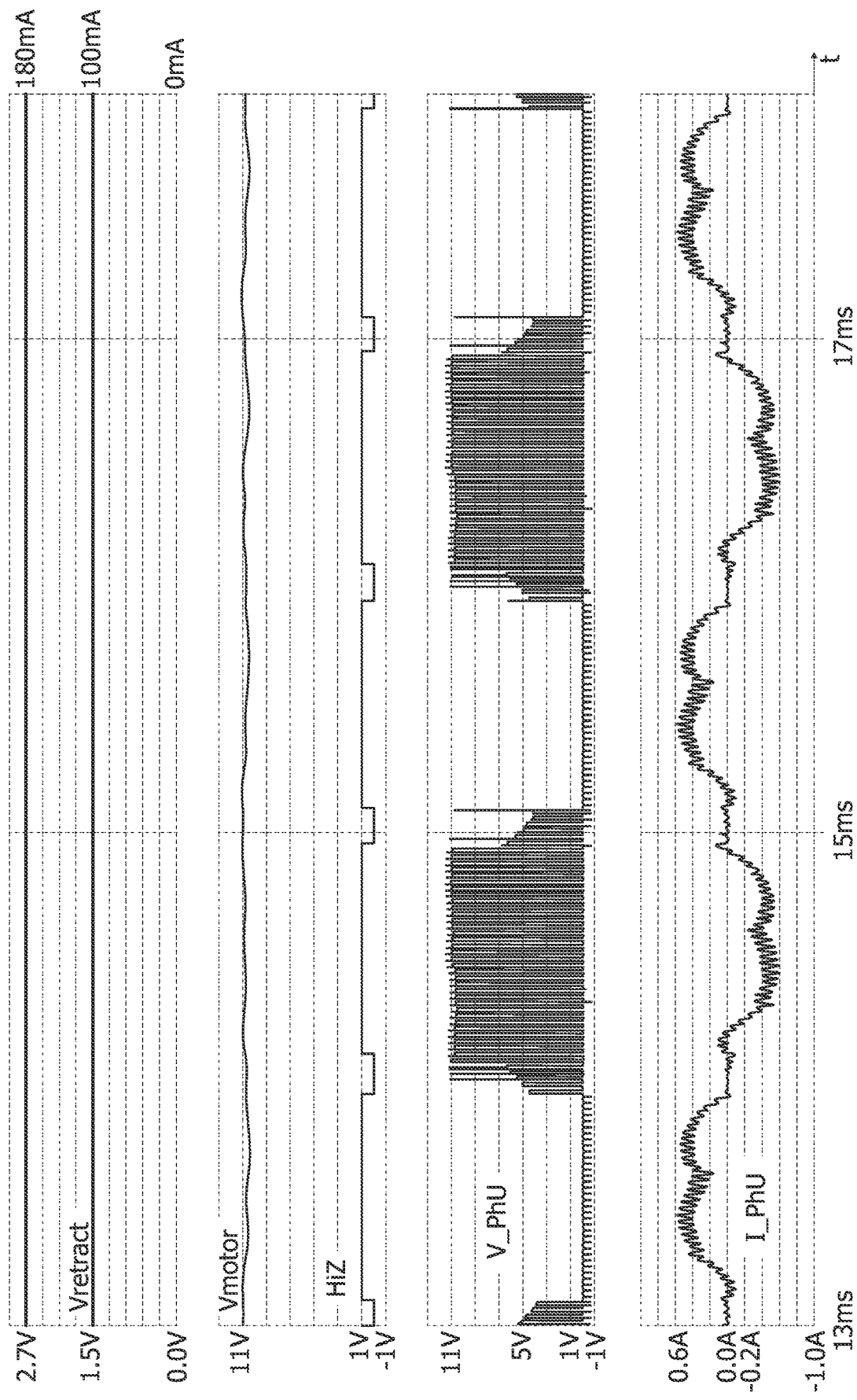

The curves of the diagram of FIG. 9 are illustrative of a possible time behavior of (from top to bottom) a current flowing into the VCM coil, a voltage Vretract that energizes the head retract procedure, the voltage Vmotor, a signal designated HiZ (high impedance), the (U phase) voltage V_PhU, and the (U-phase) current I_PhU.

As exemplified in FIG. 9, BEMF rectification is performed by selecting an active step-up or a passive step-up according to the status of the HiZ signal.

For instance, the signal HiZ can be asserted to a logical value (e.g., forced "low," but a complementary choice is of course possible) at a first detection of the spindle current polarity inversion (change of the current polarity signal) and is maintained low for a time (programmable) related to the speed of the SM motor.

The signal HiZ is used to force to a passive step-up the system for the period of time the HiZ signal is asserted (e.g., forced low).

For instance, while the time signal HiZ is low, the spindle step-up routine (as controlled by the controller 12) consists in an alternation of a brake phase (FIG. 3A) followed by a tristate phase as discussed previously; this can be defined a "passive" step-up in contrast to an "active" step-up as represented in FIG. 3B.

Again, FIG. 9 (like FIG. 8) shows the situation for the phase U spindle winding, PhU. The same concept and type of operation can be extended to the phase V spindle winding PhV and to the phase W spindle winding PhW.

As discussed herein, undesired under-modulation of the switching frequency in synchronous spindle step-up can thus be effectively countered by detecting, based on the output signals of the flip-flops FF D_V; FF D_W; FF D_U, a first inversion of the direction of flow of the currents I_PhU, I_PhV, and I_PhW through the windings of the spindle motor SM, asserting (e.g., setting lo logic "low") for a—possibly programmable—time interval a (first inversion) detection signal HiZ_V, HiZ_W, HiZ_U in response to the first inversion of the direction of flow of the currents being detected, and omitting the active step-up phase in the alternate sequence (which is thus limited to an alternation of brake and tristate phases, with active step-up phases omitted) in response to the detection signal HiZ_V, HiZ_W, HiZ_U being asserted.

That is, at each current inversion (this takes place twice during each electrical period) the circuit moves from active step up to passive step up for a predetermined (programmable) time.

Figure 10:
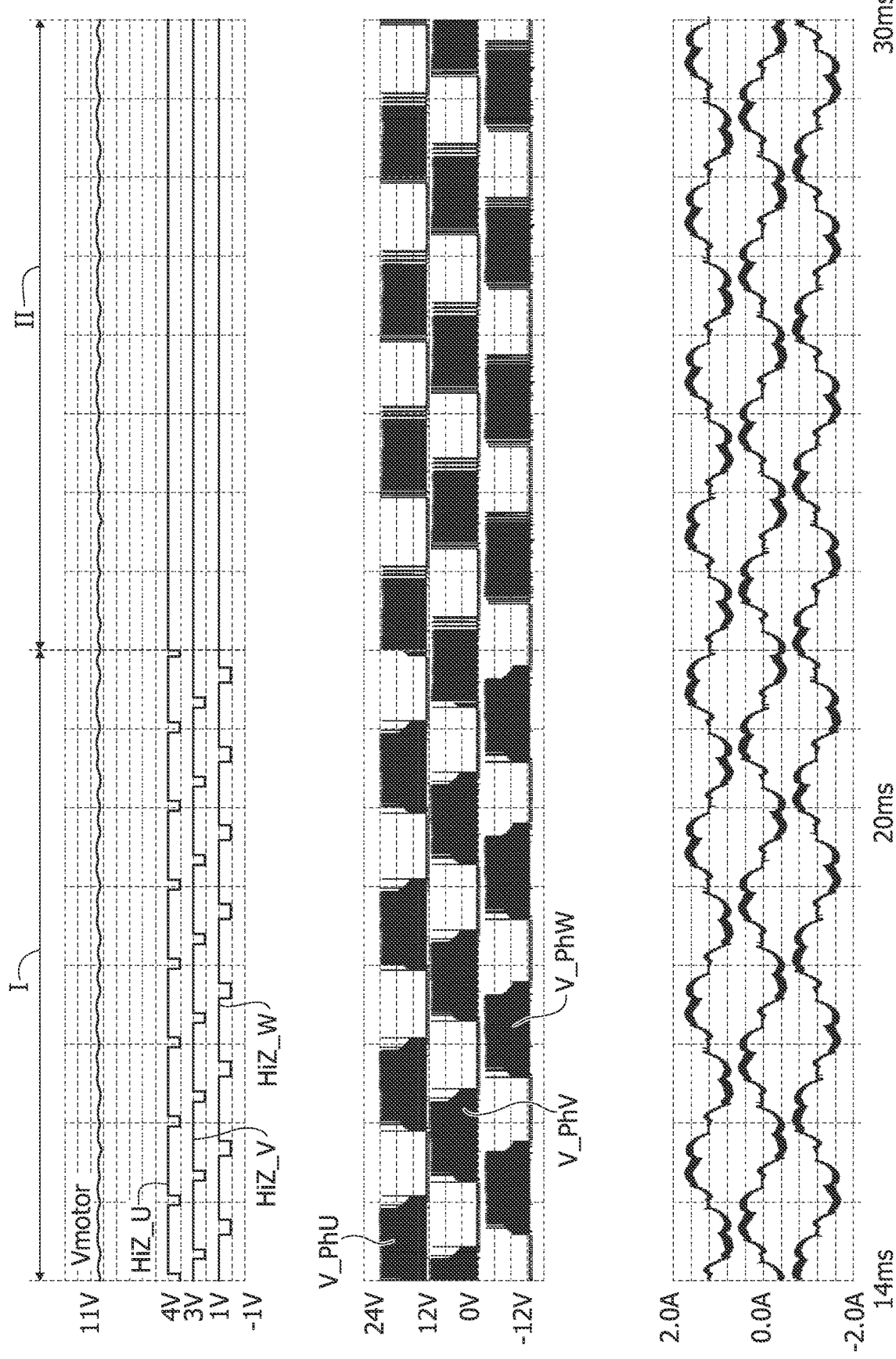

FIG. 10 is a synoptical representation referred to all of the spindle windings, PhU, PhV, and PhW.

The left-hand side of the figure (referenced as I) refers to solutions as presented herein. The curves on the left-hand side of the diagram of FIG. 10 are illustrative of a possible time behavior of (from top to bottom), the voltage Vmotor, respective HiZ signals for the phases U, V, and W, the phase voltages V_PhU, V_PhV, and V_PhW for the phases U, V, and W, respectively, and the phase currents I_PhU, I_PhV, and I_PhW for the phases U, V, and W, respectively.

The respective HiZ signals for the phases U, V, and W, namely HiZ_U, HiZ_V, and HiZ_W as derived from the current polarity signals CurPolU, CurPolV, and CurPolW. For example, as shown in FIG. 6, the signals HiZ_U, HiZ_V, and HiZ_W may go "low" in response to a first detection of a current inversion and stay "low" for a certain, advantageously programmable, time.

Conversely, the curves on the right-hand side of the diagram of FIG. 10 (referenced as II) are illustrative of a possible time behavior of (from top to bottom) the voltage Vmotor, the phase voltages V_PhU, V_PhV, and V_PhW for the phases U, V, and W, respectively, and the phase currents I_PhU, I_PhV, and I_PhW for the phases U, V, and W, respectively. These curve are taken in a prior art arrangement where no use is made of the signals HiZ_U, HiZ_V, and HiZ_W.

Solutions as described herein are advantageous over conventional solutions for various reasons.

For instance, without losing efficiency in spindle BEMF rectification, solutions as discussed herein can be integrated using low-voltage components. This results in simpler architecture taking less semiconductor area.

Spindle current ripple can be maintained at a fixed frequency, avoiding sub-harmonics that might produce undesired acoustic noise emission.

An alternative is provided in performing spindle step-up. The system is able to detect when the spindle current changes its polarity (sign) and automatically switch from an active step-up condition to a passive step-up condition for a defined amount of time.

Power off spindle BEMF rectification can be carried out using a mixed active/passive spindle step-up approach according to the current amplitude and phase.

Operation can be in a "normal" active step-up configuration and switch to passive step-up at a first detection of current polarity inversion for a defined amount of time, before returning to active step-up operation.

Without prejudice to the underlying principles, the details and embodiments may vary, even significantly, with respect to what has been described in the foregoing, by way of example only, without departing from the extent of protection.

The extent of protection is determined by the annexed claims.

What is claimed is:

1. A circuit, comprising:
    a first level shifter having a first input configured to be coupled to a first winding of a motor and a second input configured to be coupled to a motor voltage node;
    a second level shifter having a first input configured to be coupled to a second winding of the motor and a second input configured to be coupled to the motor voltage node;
    a third level shifter having a first input configured to be coupled to a third winding of the motor and a second input configured to be coupled to the motor voltage node;
    a first flip-flop having an input coupled to an output of the first level shifter, the first flip-flop also having an output configured to carry a signal indicative of a direction current flow through the first winding;
    a second flip-flop having an input coupled to an output of the second level shifter, the second flip-flop also having an output configured to carry a signal indicative of a direction current flow through the second winding; and
    a third flip-flop having an input coupled to an output of the third level shifter, the third flip-flop also having an output configured to carry a signal indicative of a direction current flow through the third winding.

2. The circuit of claim 1, wherein each level shifter is configured to provide a down-shifted replica of a voltage at the first input of that level shifter.

3. The circuit of claim 1, wherein each level shifter comprises a resistor and a Zener diode coupled in series between the first input and a reference node, the output of the level shifter being taken at a tap node between the resistor and the Zener diode.

4. The circuit of claim 1, wherein each level shifter comprises a resistor coupled between the first input and a tap node and a Zener diode coupled between the tap node and a reference node, the output of the level shifter being taken at the tap node.

5. The circuit of claim 4, wherein, for each level shifter, the Zener diode has a cathode coupled to the tap node.

6. The circuit of claim 1, wherein the first, second and third flip-flops each comprise a D-type flip-flop.

7. A system comprising:
    the motor; and
    the circuit of claim 1, wherein the first input of the first level shifter is coupled to the first winding of the motor, the first input of the second level shifter is coupled to the second winding of the motor, and the first input of the third level shifter is coupled to the third winding of the motor.

8. The system of claim 7, further comprises a disk of a hard disk drive, wherein the motor is configured to rotate the disk.

9. A circuit, comprising:
    a set of input nodes configured to be coupled to respective ones of windings of a spindle motor in a hard disk drive to sense voltages applied to the windings;
    a set of output nodes configured to provide output signals indicative of direction of flow of currents through the windings;
    a plurality of level shifters coupled to respective input nodes in the set of input nodes and having level-shifted output nodes configured to provide down-shifted replicas of voltages at the respective input nodes in the set of input nodes; and
    a plurality of flip-flops having inputs coupled to respective ones of the level-shifted output nodes of the level shifters and outputs configured to provide the output signals coupled to respective output nodes.

10. The circuit of claim 9, wherein the level shifters each comprise a resistor and a Zener diode coupled between a respective input node in the set of input nodes and a reference node, each level shifter having a tap node between the resistor and the Zener diode, the level-shifted output node is coupled to receive a level-shifted output node of the level shifter from the tap node.

11. The circuit of claim 10, wherein, for each level shifter, the resistor is coupled between the respective input node and the tap node, and the Zener diode is coupled between the tap node and the reference node.

12. The circuit of claim 11, wherein a cathode of the Zener diode is coupled to the tap node.

13. The circuit of claim 9, wherein the flip-flops comprise D-type flip-flops.

14. A hard disk drive, comprising:
    a spindle motor having a plurality of windings;
    a circuit according to claim 9, wherein the input nodes of the circuit are coupled to the windings of the spindle motor to sense voltages applied to the windings; and
    a controller coupled to the set of output nodes, the controller configured to receive the output signals indicative of a direction of flow of currents through the windings and to control the spindle motor based on the output signals indicative of the direction of flow of the currents through the windings.

15. A method of operating a hard disk drive that includes a spindle motor, the method comprising:
    driving the spindle motor in a brake phase, wherein the spindle motor is short-circuited and a spindle back electromotive force (BEMF) forces currents through windings of the spindle motor;
    driving the spindle motor in a tristate phase after the brake phase, wherein the tristate phase comprises detecting a direction of flow of currents through the windings by generating down-shifted replicas of voltages at the windings and latching a signal indicative of the direction of current flow; and
    driving the spindle motor in an active step-up phase after the tristate phase, wherein the currents through the windings of the spindle motor are recirculated based on the signal indicative of the direction of current flow.

16. The method of claim 15, the method further comprising:
after driving the spindle motor in an active step-up phase, again driving the spindle motor in the brake phase and then in the tristate phase;
detecting, based on the signal indicative of the direction of current flow, a first inversion of the direction of flow of the currents through the windings of the spindle motor; and
asserting for a time interval a detection signal in response to the first inversion of the direction of flow of the currents being detected; and
yet again driving the spindle motor in the brake phase without first performing the active step-up phase in response to the detection signal being asserted.

17. The method of claim 16, comprising selectively varying the time interval.

18. The method of claim 17, comprising selectively programming the time interval as a function of a spindle motor speed of the spindle motor.

19. The method of claim 15, wherein detecting the direction of flow of the currents through the windings comprises coupling each winding to a first end of a respective resistor that has a second end coupled to a cathode of a Zener diode with an anode coupled to a reference node.

20. The method of claim 19, wherein latching the signal indicative of the direction of current flow comprises latching a signal carried at a tap node between the resistor and the Zener diode in a D flip-flop.

\* \* \* \* \*